United States Patent [19]

Olson

[11] Patent Number: 5,676,390

[45] Date of Patent: Oct. 14, 1997

[54] AIR BAG MODULE WITH SNAP ATTACHMENT FOR HOUSING PARTS

[75] Inventor: Mark O. Olson, Waterford, Mich.

[73] Assignee: TRW Vehicle Safety Systems Inc., Lyndhurst, Ohio

[21] Appl. No.: 555,006

[22] Filed: Nov. 9, 1995

[51] Int. Cl.$^6$ ............................................. B60R 21/16
[52] U.S. Cl. .......................... 280/728.2; 280/728.1; 280/732
[58] Field of Search .................. 280/728.2, 728.1, 280/732, 743.1; 220/610, 615

[56] References Cited

U.S. PATENT DOCUMENTS

| | | | |
|---|---|---|---|
| 4,941,678 | 7/1990 | Lauritzen et al. | 280/732 |
| 5,069,480 | 12/1991 | Good | 280/728.2 |
| 5,234,227 | 8/1993 | Webber | 280/728.1 |
| 5,342,082 | 8/1994 | Kriska et al. | 280/728.1 |
| 5,351,987 | 10/1994 | Donegan et al. | 280/728.1 |
| 5,356,174 | 10/1994 | Rhein et al. | 280/728.1 |
| 5,431,432 | 7/1995 | Webber et al. | 280/728.2 |
| 5,462,305 | 10/1995 | Hamada | 280/732 X |
| 5,503,425 | 4/1996 | Emambakhsh et al. | 280/728.2 |
| 5,511,819 | 4/1996 | Spilker et al. | 280/728.2 |

OTHER PUBLICATIONS

U.S. Patent Appln. Serial No. 08/377,475, filed Jan. 24, 1995 entitled "Air Bag Module".

Primary Examiner—Christopher P. Ellis
Attorney, Agent, or Firm—Tarolli, Sundheim, Covell, Tummino & Szabo

[57] ABSTRACT

An apparatus (20) comprises a housing (22) which includes a main body (24) and two end plates (26, 28) located at opposite ends of the main body to define a chamber (60). An inflatable vehicle occupant protection device (42) is located at least partially in the chamber (60). A retainer (44) mounts the inflatable vehicle occupant protection device (42) to the housing (22). An inflator (40) is located in the chamber for inflating the inflatable vehicle occupant protection device (42). Attachment structure on the end plates (26, 28) and the main body (24) attaches the end plates to the main body. The attachment structure comprises an opening (240) in one of the end plates (26, 28) and the main body (24) and a projection (242) on the other of the main body and the end plates. The opening (240) receives the projection (242). Fasteners (282) on the retainer (44) extend through each of the end plates (26, 28) to hold the end plates against the main body (24).

26 Claims, 5 Drawing Sheets

Fig.1

AIR BAG MODULE WITH SNAP ATTACHMENT FOR HOUSING PARTS

BACKGROUND OF THE INVENTION

1. Technical Field

The present invention relates to an inflatable vehicle occupant protection device, such as an air bag, and in particular to a housing for a module which contains the air bag.

2. Description of the Prior Art

An air bag module for a vehicle typically includes an air bag, an actuatable inflator for inflating the air bag, and a housing which contains the air bag and the inflator. A retaining ring mounts the air bag and attaches the air bag to the housing. Upon detecting a vehicle situation, such as a collision, which requires inflation of the air bag, the inflator is actuated to inflate the air bag. The inflated air bag is positioned between an occupant and parts of the vehicle to protect the occupant.

SUMMARY OF THE INVENTION

The present invention is directed to an apparatus for protecting an occupant of a vehicle. The apparatus comprises a housing which defines a chamber. The housing includes a main body and two end plates. Each end plate is located at a respective opposite end of the main body. An inflatable vehicle occupant protection device is located at least partially in the chamber in the housing. A retainer mounts the inflatable vehicle occupant protection device to the housing. An actuatable inflator is located in the chamber for inflating, when actuated, the protection device. Attachment means on the end plates and the main body of the housing attaches the end plates to the main body. The attachment means comprises an opening in one of the main body and the end plates. The attachment means also comprises a projection on the other of the main body and the end plates. The projection is received in the opening to attach the end plates to the main body.

Fasteners which are fixed to the retainer extend through openings in the end plates to hold the end plates against the main body. The attachment means attaches the end plates to the main body prior to the end plates being held against the main body by the fasteners. Each of the end plates includes a plate portion and a flange portion extending transversely from the plate portion. The plate portion extends perpendicular to a longitudinal axis of the housing.

The main body of the housing includes first and second side walls and a central wall which extends transverse to the first and second side walls. The central wall interconnects the first and second side walls to form a generally U-shaped main body. Each one of the first and second end plates of the housing has a generally U-shaped configuration similar to the generally U-shaped configuration of the main body of said housing. The main body has opposite ends.

The flange portion of each end plate overlies a respective end of the main body. The part of the attachment means on the end plate is located on the flange portion. In one embodiment of the attachment means, the projection is formed on the flange portion of the end plate. The opening is formed in one of the side walls of the main body. In another embodiment of the attachment means, the opening is formed in the central wall of the main body. In yet another embodiment of the attachment means, a flange extends from a side wall of the main body and a tab end extends from a flange portion of the end plate. The projection is formed on the tab end and the opening is formed in the flange of the main body.

The inflator is elongate with a cylindrical configuration including a body portion and opposite ends. Another fastener is located on one of the ends of the inflator. A flange is located on another end of the inflator. The flange on the inflator has a diameter which is larger than the diameter of the body portion. One end plate has an inflator opening with a diameter which is at least as large as the diameter of the body portion and less than the diameter of the flange. The inflator is located substantially between the end plates. The flange is engageable with the one end plate when the body portion of the inflator extends through the inflator opening and is located in the chamber. The fastener on the end of the inflator extends through a fastener opening in the other end plate.

According to alternate embodiments of the invention, the inflator has no fastener or flange. In one alternate embodiment, each of the end plates includes a cup for receiving an end of the inflator to locate and hold the inflator in position relative to the main body. In another alternate embodiment, the main body includes a portion projecting into the chamber to engage the inflator and space the inflator from walls of the main body and hold the inflator in position relative to the main body.

BRIEF DESCRIPTION OF THE DRAWINGS

Other features and advantages of the present invention will become apparent to one skilled in the art to which the present invention relates upon reading the following description with reference to the accompanying drawings, in which.

DESCRIPTION OF PREFERRED EMBODIMENTS

A vehicle occupant protection device comprises an air bag module 20 (FIG. 1) which may be embodied in various constructions. The air bag module 20, according to a first embodiment of the present invention, includes a housing 22 having a main body 24 and two end plates 26, 28. The air bag module 20 also includes an inflator 40, an inflatable air bag 42, and a retainer 44.

The air bag module 20 is for mounting in an instrument panel (not shown) of a vehicle. The housing 22 includes mounting brackets or other structure (not shown) for securing the housing to the instrument panel. The air bag 42, when inflated, deploys in a direction within a passenger compartment of the vehicle to cushion and restrain movement of an occupant of the vehicle and protect the occupant from forcefully impacting parts of the vehicle.

The main body 24 of the housing 22 has opposite ends 46, 48. The end plate 26 engages the end 46 of the main body 24. The end plate 28 engages the end 48 of the main body 24. The main body 24 and the end plates 26, 28 of the housing 22 cooperate to define a chamber 60 within the housing. A longitudinal axis A (FIG. 2) of the air bag module 20 extends between the end plates 26, 28 and through the chamber 60 in the housing 22.

The main body 24 of the housing 22 is preferably extruded from an aluminum alloy or cast from a magnesium alloy. The main body 24 includes a left side wall 80, as viewed in FIG. 2, which is spaced from and extends parallel to the axis A. The left side wall 80 has an outer side surface 82, an inner side surface 84, and a flange 86 extending transversely outward from the left side wall. A right side wall 100 of the main body 24 is spaced from and extends parallel to the left side wall 80 and to the axis A. The right side wall 100 has an outer side surface 102, an inner side surface 104 and a flange 106 which extends transversely outward from the right side wall.

The main body 24 of the housing 22 further includes a central wall 120 extending between and interconnecting the left side wall 80 and the right side wall 100. The central wall 120 is spaced from and extends parallel to the axis A. The central wall 120 has an inner side surface 122 and an outer side surface 124. The main body 24 thus has a U-shaped cross-section in a plane normal to the axis A, as viewed in FIG. 2.

Parallel ribs 140 project inward from the inner surfaces 84 and 104 of each of the side walls 80 and 100 of the main body 24. The uppermost ribs 140, as viewed in FIG. 2, include cam surfaces 142 which lead to the uppermost ribs and which form a part of the respective inner surfaces 84, 104 of the side walls 80, 100. A recess 144 is defined by the ribs 140 in each side wall 80, 100 of the main body 24. The recesses 144 receive the retaining ring 44 and a portion of the air bag 42, as is described below.

The end plate 26 includes a plate portion 160 (FIG. 1) which extends perpendicular to the axis A when the end plate is attached to the main body 24. The plate portion 160 also extends perpendicular to the side walls 80, 100 and the central wall 120 of the main body 24. A circular fastener opening 164 (FIG. 1) is formed in the plate portion 160 of the end plate 26. The fastener opening 164 has its center located on the axis A of the air bag module 20 when the end plate 26 is attached to the main body 24. Two other circular fastener openings 166 and 168 are also formed in the plate portion 160 of the end plate 26. The fastener openings 166, 168 have smaller diameters than the diameter of the fastener opening 164. Each one of the fastener openings 166 and 168 is spaced from the axis A and the fastener opening 164.

Figure 2:
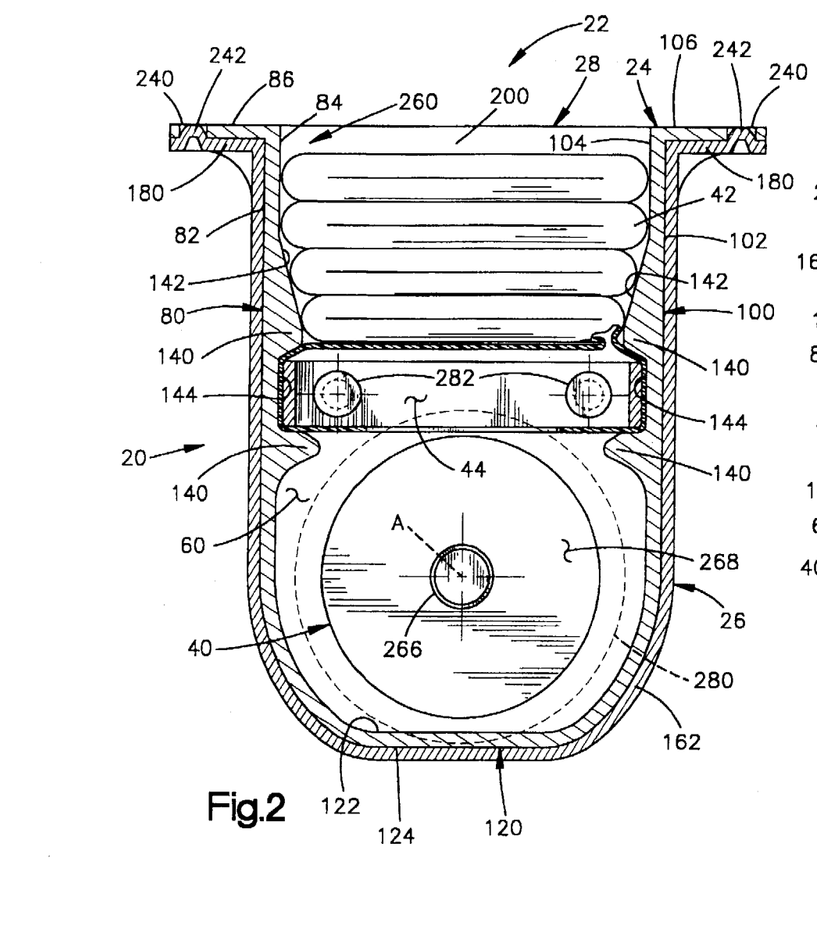
FIG. 2 is a sectional view of the assembled air bag module of FIG. 1.

The end plate 26 also includes a flange portion 162 which extends from the plate portion 160 in a direction normal to the plate portion. The flange portion 162 of the end plate 26 extends in a direction toward the end plate 28 when the end plates are attached to the main body 24. The flange portion 162 extends from three sides of the plate portion 160 and includes a pair of end tabs 180 which extend outward in opposite directions from the plate portion. The end tabs 180 are contained in a plane which is normal to the plate portion 160 and to facing parallel sides of the flange portion 162. The flange portion 162 has a size and shape to fit closely around and frictionally engage a portion of the main body 24 adjacent the end 46, as illustrated in FIG. 2. The end tabs 180 engage the flange portions 86, 106 of the main body 24 when the flange portion 162 of the end plate 26 is located around the portion of the main body adjacent the end 46.

The end plate 28 of the housing 22 (FIG. 1) is similar in construction to the end plate 26. The end plate 28 includes a plate portion 200 which extends perpendicular to the axis A when the end plate is attached to the main body. The plate portion 200 also extends perpendicular to the side walls 80, 100 and the central wall 120 of the main body 24. A large circular inflator opening 204 is formed in the plate portion 200 of the end plate 28. The inflator opening 204 has its center located on the axis A of the air 10 bag module 20 when the end plate 28 is attached to the main body 24. The inflator opening 204 has a diameter which is greater than the diameter of the fastener opening 164 in the end plate 26. A pair of fastener openings 206 and 208 are also formed in the plate portion 200. The fastener openings 206 and 208 have the same diameter as the fastener openings 166 and 168 in the end plate 26. Each one of the fastener openings 206 and 208 is spaced from the axis A and the inflator opening 204.

Figure 1:
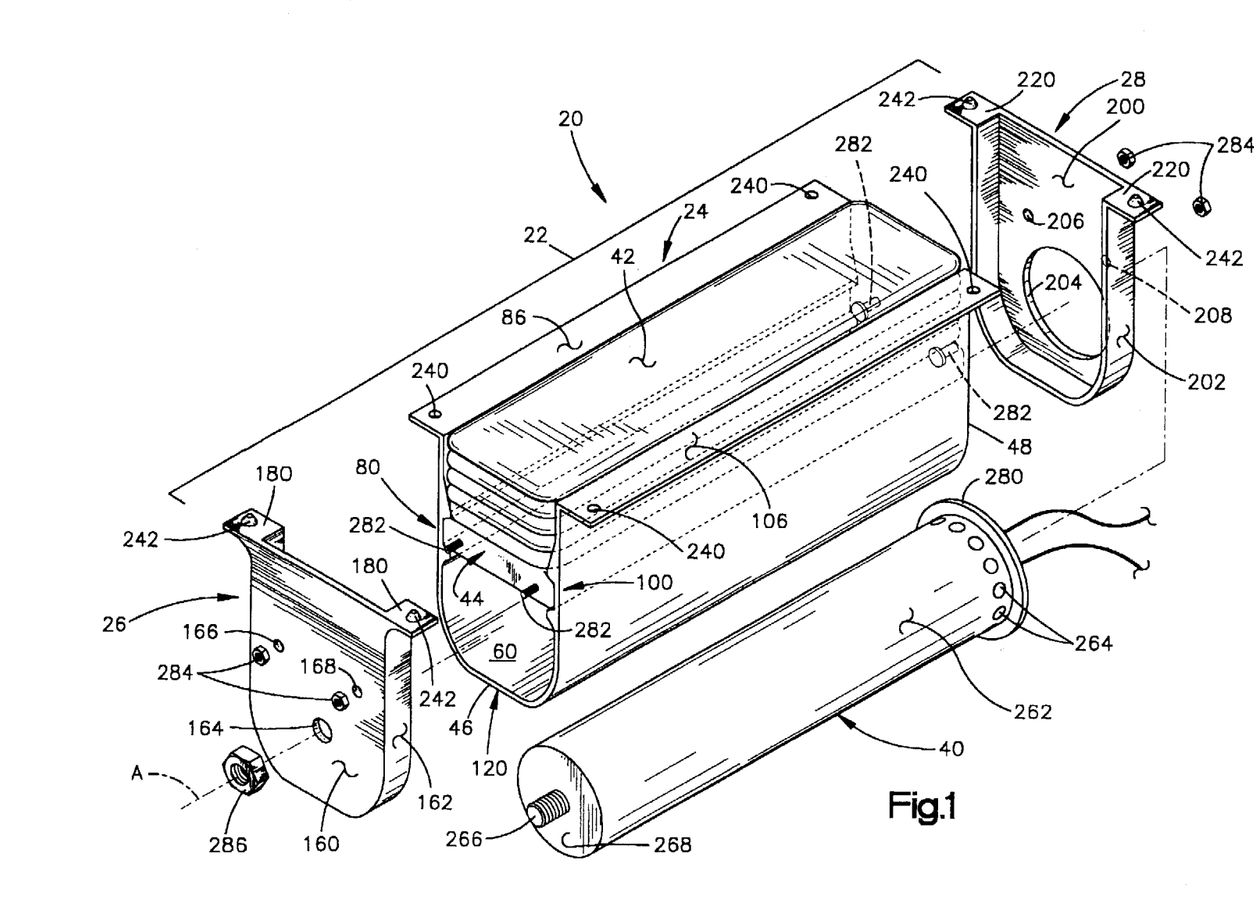
FIG. 1 is an exploded perspective view of an air bag module embodying the present invention.

The end plate 28 also includes a flange portion 202 which extends from the plate portion 200 in a direction normal to the plate portion. The flange portion 202 of the end plate 28 extends in a direction toward the end plate 26 when the end plates are attached to the main body 24. The flange portion 202 extends from three sides of the plate portion 200 and includes a pair of end tabs 220 which extend outward in opposite directions from the plate portion. The end tabs 220 are contained in a plane which is normal to the plate portion 200 and to facing parallel sides of the flange portion 202. The flange portion 202 has a size and shape to fit closely around and frictionally engage a portion of the main body 24 adjacent the end 48. The end tabs 220 engage the flange portions 86, 106 of the main body 24 when the flange portion 202 of the end plate 28 is located around the portion of the main body adjacent the end 48.

Openings 240 are formed in the flanges 86, 106 of the main body 24. Two openings 240 are located in the flange 86 of the main body 24. One opening 240 in the flange 86 is located adjacent the end 46. One opening 240 in the flange 86 is located adjacent the end 48. Two openings 240 are located in the flange 106 of the main body 24. One opening 240 in the flange 106 is located adjacent the end 46. One opening 240 in the flange 106 is located adjacent the end 48.

Projections 242 are stamped on the end tabs 180, 220 of the end plates 26, 28. The projections 242 on the end tabs 180, 220 are located to extend into the openings 240 in the flanges 86, 106 of the main body 24, as illustrated in FIG. 2, when the flange portions 162, 202 of the end plates 26, 28 are fitted around an end portion of the main body. The projections 242 and openings 240 cooperate to hold the end plates 26, 28 on the main body 24.

Each of the projections 242 is generally cone shaped. The openings 240 and the projections 242 are sized so that each projection fits tightly within a respective opening. Preferably, a side surface of the projection 242 engages a portion of the circular surface defining the respective opening 240. Engagement between the projections 242 and surfaces of the openings 240 acts in concert with friction of the flange portions 162, 202 of the end plates 26, 28 against the main body 24 to retain the end plates on the main body. It will be apparent that the openings 240 could be formed in the end plates 26, 28 and the projections 242 formed on the main body 24.

A deployment opening 260 (FIG. 2) is defined by the housing 22 when the end plates 26, 28 are attached to the main body 24. The air bag module 20 includes a cover (not shown) for covering the deployment opening 260. The cover is made of plastic and closes the deployment opening 260 to conceal the air bag 42 when the air bag is stored in the housing 22. The cover is preferably configured to form a portion of the instrument panel of the vehicle which is visible to a vehicle occupant.

The inflator 40 (FIG. 1) is a known air bag inflator having an elongate cylindrical body 262 extending along the axis A. The body 262 is slightly smaller in diameter than the inflator opening 204 in the end plate 28 of the housing 22. The inflator body 262 has a plurality of fluid outlet openings 264 through which inflation fluid can flow into the chamber 60 to inflate the air bag 42. A threaded mounting bolt 266 extends axially from an end surface 268 of the inflator 40. A radially extending flange 280 is formed at an opposite end of the inflator 40. The flange 280 is larger in diameter than the inflator opening 204 in the end plate 28 of the housing 22.

The retaining ring 44 (FIGS. 1 and 2) is generally rectangular and is preferably made from sheet metal or as a metal casting. Threaded fasteners 282 are fixed to opposite ends of the retaining ring 44. The fasteners 282 extend from the retaining ring 44 in a direction parallel to the axis A.

The air bag 42 is made from a fabric material, preferably woven nylon. The air bag 42 is mounted to the retaining ring 44 by inserting the retaining ring into an open end of the air bag. The threaded fasteners 282 extend through fastener openings in the air bag 42. The air bag 42 is folded to form a package with the retaining ring 44.

During assembly of the air bag module 20, the package of the retaining ring 44 and air bag 42 is initially positioned outside the main body 24 adjacent to the flanges 86, 106. The package of the retaining ring 44 and air bag 42 is moved into the main body 24 between the side walls 80, 100 and in a direction toward the central wall 120. The retaining ring 44 and a portion of the air bag 42 engage the cam surfaces 142 on the side walls 80, 100. The side walls 80, 100 of the main body 24 resiliently deflect away from one another as the retaining ring 44 and portion of the air bag 42 pass over the cam surfaces 142. The side walls 80 and 100 of the main body 24 return to the position illustrated in FIG. 2 when the retaining ring 44 and portion of the air bag 42 move into the recesses 144 in the main body. The lower ribs 140, as viewed in FIG. 2, limit further movement of the retaining ring 44 and portion of the air bag 42 so the package is clamped in the recesses 144 of the main body 24.

The end plates 26, 28 are then placed over the ends 46, 48 of the main body 24. The flange portions 162, 202 of the end plates 26, 28 frictionally engage the main body 24. The projections 242 on the end plates 26, 28 extend into the openings 240 in the flanges 86, 106 of the main body 24. Thus, the end plates 26, 28 are held on the main body 24. The projections 242 located in the openings 240 inhibit movement of the end plates 26, 28 in a direction parallel to the axis A of the housing 22.

The threaded fasteners 282 on the retaining ring 44 extend through the fastener openings 166, 168, 206, 208 in the plate portions 160, 200 of the end plates 26, 28. Nuts 284 are screwed onto the portions of the threaded fasteners 282 which extend through the end plates 26, 28. The length of the main body 24 of the housing 22, measured parallel to the axis A, is selected so that the end plates 26 and 28 are drawn up tight against the ends 46, 48 of the main body when the nuts 284 are tightened on the threaded fasteners 282 on the retaining ring 44. Thus, the retaining ring 44 aids in holding the end plates 26, 28 against the ends 46, 48 of the main body 24.

The inflator 40 is then placed into the chamber 60 of the assembled housing 22 of the air bag module 20. The inflator 40 is moved along the axis A through the inflator opening 204 in the end plate 28 and into the chamber 60. The mounting bolt 266 on the end surface 268 of the inflator 40 extends through the fastener opening 164 in plate portion 160 of the end plate 26. The flange 280 on the inflator 40 engages the plate portion 200 of the end plate 28.

A nut 286 is screwed onto the mounting bolt 266 on the end surface 268 of the inflator 40 and tightened against the end plate 26 to hold the inflator in position in the chamber 60. The axial distance between the end surface 268 and the flange 280 on the inflator 40 is selected so that the flange is drawn up tight against the plate portion 200 of the end plate 28 when the nut 286 is tightened on the mounting bolt 266 and against the end plate 26. Thus, the inflator 40 also aids in holding the end plates 26, 28 to the main body 24 of the housing 22. It will be apparent that the inflator 40, the retaining ring 44, the flange portions 162, 202, as well as the projections 242 and openings 240, all cooperate to attach and hold the end plates 26, 28 to the main body 24 and form the housing 22.

Figure 3:
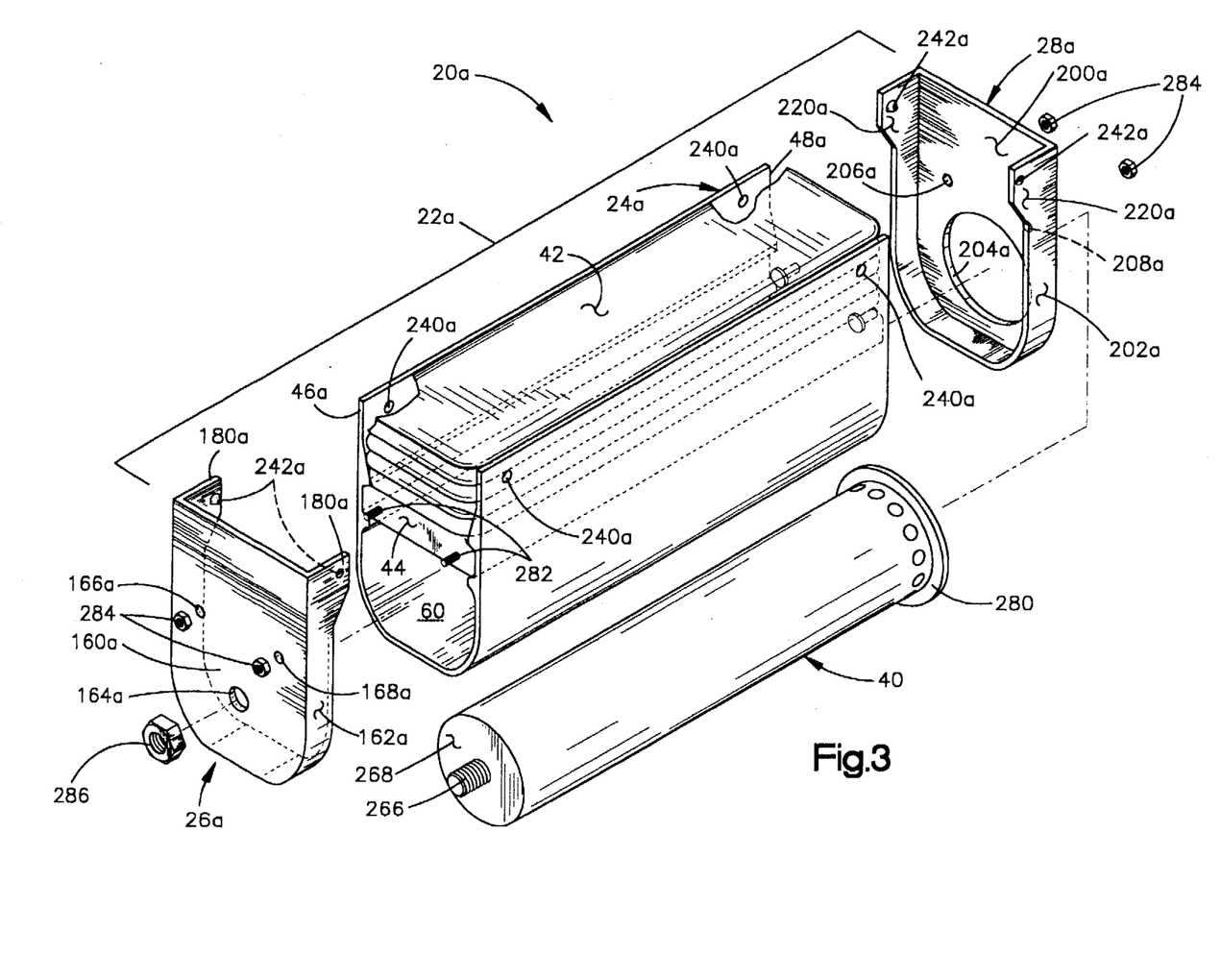
FIG. 3 is an exploded perspective view of an air bag module constructed according to a second embodiment of the present invention.

FIG. 3 illustrates an air bag module 20a which is constructed according to a second embodiment of the present invention. Parts of the air bag module 20a which are the same as parts of the air bag module 20 (FIGS. 1–2) are given the same reference numeral. Parts of the air bag module 20a which are different or modified versions of parts in the air bag module 20 are given the same reference numeral with a suffix "a".

The air bag module 20a, according to the second embodiment, includes a housing 22a having a main body 24a and two end plates 26a, 28a. The air bag module 20a includes the inflator 40, the inflatable air bag 42, and the retainer 44.

The main body 24a of the housing 22a has opposite ends 46a, 48a. The end plate 26a engages the end 46a of the main body 24a. The end plate 28a engages the end 48a of the main body 24a. The main body 24a and the end plates 26a, 28a cooperate to define a chamber 60 within the housing 22a. A longitudinal axis A (FIG. 4) of the air bag module 20a extends between the end plates 26a and 28a of the housing 22a.

Figure 4:
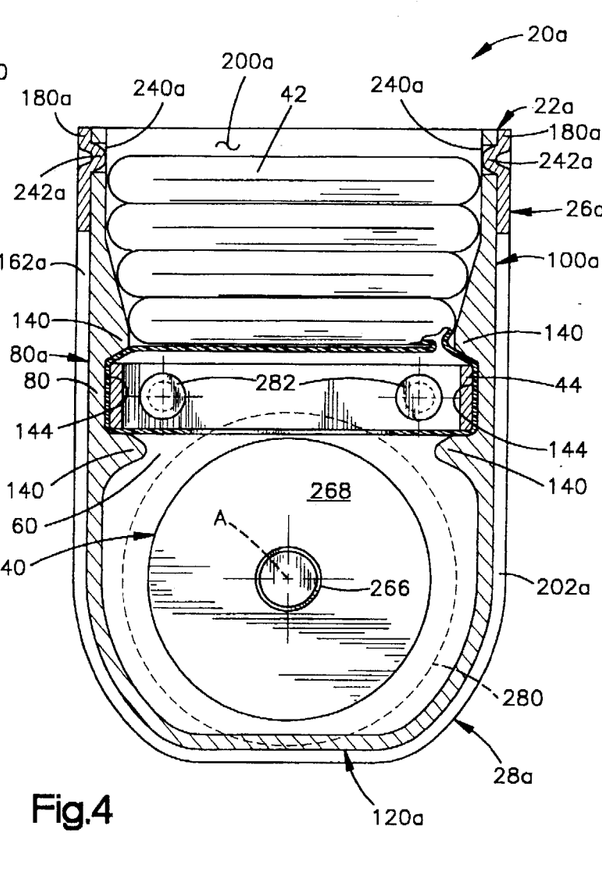
FIG. 4 is a sectional view of the assembled air bag module of FIG. 3.

The main body 24a includes a left side wall 80a and a right side wall 100a, as viewed in FIG. 4, which are spaced from and extend parallel to the axis A. A central wall 120a extends between and interconnects the left side wall 80a and the right side wall 100a. The central wall 120a is spaced from and extends parallel to the axis A. The main body 24a has no flanges extending outward from the side walls 80a, 100a as does the main body 24. Parallel ribs 140 project inward from the side walls 80a and 100a and define a recess 144 in each side wall of the main body 24a. The recesses 144 receive the retaining ring 44 and a portion of the air bag 42.

The end plate 26a includes a plate portion 160a (FIG. 3) which extends perpendicular to the axis A when the end plate is attached to the main body 24a. The plate portion 160a also extends perpendicular to the side walls 80a, 100a and the central wall 120a of the main body 24a. A circular fastener opening 164a is formed in the plate portion 160a of the end plate 26a. The fastener opening 164a has its center located on the axis A of the air bag module 20a. Two other circular fastener openings 166a and 168a, have smaller diameters than the diameter of the fastener opening 164a, and are also formed in the plate portion 160a of the end plate 26a. Each one of the fastener openings 166a and 168a is spaced from the axis A and the fastener opening 164a.

The end plate 26a also includes a flange portion 162a which extends from the plate portion 160a in a direction normal to the plate portion. The flange portion 162a of the end plate 26a extends in a direction toward the end plate 28a when the end plates are attached to the main body 24a. The flange portion 162a extends from three sides of the plate portion 160a and includes a pair of end tabs 180a. Each end tab 180a extends from a respective facing parallel side of the flange portion 162a in a direction parallel to the facing parallel side. The end tabs 180a engage the side walls 80a, 100a of the main body 24a when the flange portion 162a of the end plate 26a is located around the main body 24a adjacent the end 46a, as viewed in FIG. 4.

The end plate 28a of the housing 22a (FIG. 3) is similar in structure to the end plate 26a. The end plate 28a includes a plate portion 200a which extends perpendicular to the axis A when the end plate is attached to the main body 24a. The plate portion 200a also extends perpendicular to the side walls 80a, 100a and the central wall 120a of the main body 24a. A large circular inflator opening 204a is formed in the plate portion 200a of the end plate 28a. The inflator opening 204a has a diameter which is greater than the diameter of the fastener opening 164a in the end plate 26a. The inflator opening 204a has its center located on the axis A of the air bag module 20. A pair of fastener openings 206a and 208a are also formed in the plate portion 200a. The fastener openings 206a and 208a have the same diameter as the fastener openings 166a and 168a in the end plate 26a. Each one of the fastener openings 206a and 208a is spaced from the axis A and the inflator opening 204a.

The end plate 28a also includes a flange portion 202a which extends from the plate portion 200a in a direction normal to the plate portion. The flange portion 202a of the end plate 28a extends in a direction toward the end plate 26a when the end plates are attached to the main body 24a. The flange portion 202a extends from three sides of the plate portion 200a and includes a pair of end tabs 220a. Each end tab 220a extends from a respective facing parallel side of the flange portion 202a in a direction parallel to the facing parallel side. The end tabs 220a engage the side walls 80a, 100a of the main body 24a when the flange portion 202a of the end plate 28a is located around the portion of the main body 24a adjacent the end 48a.

An opening 240a is formed in an upper portion of each of the side walls 80a, 100a of the main body 24a adjacent a respective one of the ends 46a, 48a. A projection 242a is stamped on each one of the end tabs 180a, 220a of the end plates 26a, 28a. The projections 242a on the tabs 180a, 220a extend into respective openings 240a in the side walls 80a, 100a of the main body 24a to hold the end plates 26a, 28a on the main body when the flange portions 162a, 202a of the end plates are fitted around an end portion of the main body.

Each of the projections 242a is generally cone shaped. The openings 240a and the projections 242a are sized so that each projection fits tightly within a respective opening. Preferably, a side surface of the projection 242a engages a circular surface defining the opening 240a. Engagement between the projections 242a and surfaces of the openings 240a acts in concert with friction of the flange portions 162a, 202a to hold the end plates 26a, 28a against the main body 24a, inhibit movement of the end plates away from the main body 24a in a direction along the axis A, and retain the end plates on the main body.

To assemble the air bag module 20a, the flange portions 162a, 202a of the end plates 26a, 28a are placed over the ends 46a, 48a of the main body 24a. The projections 242a on the end plates 26a, 28a extend into the openings 240a in the side walls 80a, 100a of the main body 24a to hold the end plates on the main body. Fasteners 282 on the retaining ring 44 extend through the fastener openings 166a, 168a, 206a, 208a in the end plates 26a, 28a. Nuts 284 are screwed onto the fasteners 282 extending from the end plates 26a, 28a. The end plates 26a and 28a are drawn up tight against the main body 24a of the housing 22a when the nuts 284 are tightened on the fasteners 282.

The inflator 40 is then placed into the chamber 60 of the assembled housing 22a of the air bag module 20a. The inflator 40 is moved along the axis A through the inflator opening 204a in the end plate 28a and into the chamber 60. The flange 280 on the inflator 40 engages the plate portion 200a of the end plate 28a.

The mounting bolt 266 on the end surface 268 of the inflator 40 extends through the fastener opening 164a in the plate portion 160a of the end plate 26. A nut 286 is threaded onto the mounting bolt 266 on the inflator 40 and tightened against the end plate 26a to hold the inflator in position in the chamber 60. The flange 280 on the inflator 40 is drawn up tight against the plate portion 220a of the end plate 28a when the nut 286 is tightened on the mounting bolt.

Figures 5, 6:
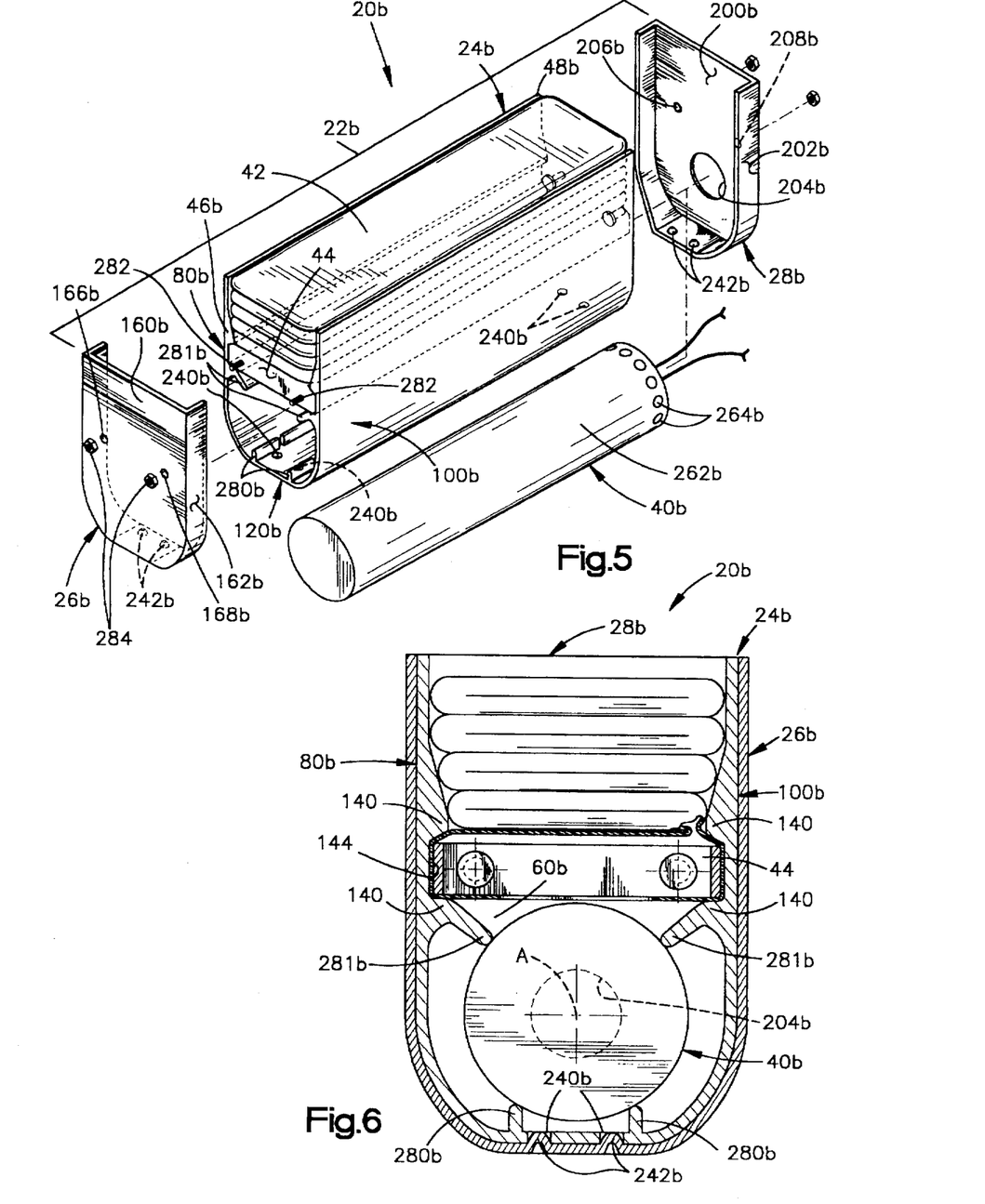
FIG. 5 is an exploded perspective view of an air bag module constructed according to a third embodiment of the present invention.
FIG. 6 is a sectional view of the assembled air bag module of FIG. 5.

FIG. 5 illustrates an air bag module 20b which is constructed according to a third embodiment of the present invention. Parts of the air bag module 20b which are the same as parts in the air bag module 20 (FIGS. 1–2) are given the same reference numeral. Parts of the air bag module 20b which are different or modified versions of parts in the air bag module 20 are given the same reference numeral with a suffix "b".

The air bag module 20b, according to the third embodiment, includes a housing 22b having a main body 24b and two end plates 26b and 28b. The air bag module 20b includes an inflator 40b, the inflatable air bag 42, and the retainer 44. The inflator 40b has no mounting bolt or flange as does the inflator 40.

The main body 24b of the housing 22b has opposite ends 46b, 48b. The end plate 26b engages the end 46b of the main body 24b. The end plate 28b engages the end 48b of the main body 24b. The main body 24b and the end plates 26b, 28b cooperate to define a chamber 60 within the housing. A longitudinal axis A (FIG. 6) of the air bag module 20b extends between the end plates 26b and 28b of the housing 22b.

The main body 24b includes a left side wall 80b and a right side wall 100b, as viewed in FIG. 6, which are spaced from and extend parallel to the axis A. A central wall 120b extends between and interconnects the left side wall 80b and the right side wall 100b. The central wall 120b is spaced from and extends parallel to the axis A. Projections 280b extend from the central wall 120b into the chamber 60. Projections 281b extend from the side walls 80b, 100b into the chamber 60. The projections 280b, 281b engage the inflator 40b to position the inflator within the chamber 60 in the housing 22. The projections 280b, 281b extend parallel to the axis A and are preferably discontinuous along their length to allow inflation fluid to flow in the chamber 60 from the inflator 40b into the air bag 42. It will be apparent that projections could be provided on the inflator 40b to space the inflator from the main body 24b.

Parallel ribs 140 project inward from the side walls 80b, 100b and define a recess 144 in each side wall of the main body 24b. The recesses 144 receive the retaining ring 44 and a portion of the air bag 42.

The end plate 26b includes a plate portion 160b (FIG. 5) which extends perpendicular to the axis A when the end plate is attached to the main body 24b. The plate portion 160b also extends perpendicular to the side walls 80b and 100b and the central wall 120b of the main body 24b. Two circular fastener openings 166b and 168b are formed in the plate portion 160b of the end plate 26b. Each one of the fastener openings 166b, 168b is spaced from the axis A.

The end plate 26b also includes a flange portion 162b which extends from the plate portion 160b in a direction normal to the plate portion. The flange portion 162b of the end plate 26b extends in a direction toward the end plate 28b when the end plates are attached to the main body 24b. The flange portion 162b extends from three sides of the plate portion 160b.

The end plate 28b of the housing 22b (FIG. 5) is similar in structure to the end plate 26b. The end plate 28b includes a plate portion 200b which extends perpendicular to the axis A when the end plate is attached to the main body 24b. The plate portion 200b also extends perpendicular to the side walls 80b, 100b and the central wall 120b of the main body 24b. A large circular wire opening 204b is formed in the plate portion 200b of the end plate 28b. The wire opening 204b has its center located on the axis A of the air bag module 20. A pair of fastener openings 206b and 208b are also formed in the plate portion 200b. The fastener openings 206b and 208b have the same diameter as the fastener openings 166b and 168b in the end plate 26b. Each one of the fastener openings 206b and 208b is spaced from the axis A and the wire opening 204b.

The end plate 28b also includes a flange portion 202b which extends from the plate portion 200b in a direction normal to the plate portion. The flange portion 202b of the end plate 28b extends in a direction toward the end plate 26b when the end plates are attached to the main body 24b. The flange portion 202b extends from three sides of the plate portion 200b.

Two openings 240b are formed in a portion of the central wall 120b of the main body 24b adjacent each one of the ends 46b, 48b. Two projections 242b are stamped on each flange portion 162b, 202b of the end plates 26b, 28b. The projections 242b on the end plates 26b, 28b extend into the openings 240b in the central wall 120b of the main body 24b to hold the end plates on the main body when the flange portions 162b, 202b of the end plates are fitted around end portions of the main body.

Each of the projections 242b is generally cone shaped. The openings 240b and the projections 242b are sized so that each projection fits tightly within a respective opening. Preferably, a side surface of the projection 242b engages a circular surface defining the opening 240b. Engagement between the projections 242b and surfaces of the openings 240b acts in concert with friction of the flange portions 162b, 202b of the end plates 26b, 28b against the main body 24b to retain the end plates on the main body.

To assemble the air bag module 20b, the inflator 40b is placed into the main body 24b of the housing 22b of the air bag module prior to at least one of the end plates 26b, 28b being attached to the main body. The inflator 40b is moved along the axis A through the chamber 60. The projections 280b, 281b engage the inflator 40 and space the inflator from the side walls 80b, 100b and central wall 120b and position the inflator within the chamber 60.

The end plates 26b, 28b are placed over the ends 46b, 48b of the main body 24b. The projections 242b on the end plates 26b, 28b extend into the openings 240b in the central wall 120b of the main body 24b to hold the end plates on the main body. Fasteners 282 on the retaining ring 44 extend through the fastener openings 166b, 168b, 206b, 208b in the end plates 26b, 28b. Nuts 284 are screwed onto the fasteners 282 extending from the end plates 26b, 28b. The end plates 26b and 28b are drawn up tight against the main body 24b of the housing 22b when the nuts 284 are tightened on the fasteners 282. Wires from the inflator 40b extend through the wire opening 204b in the end plate 28b.

Figure 7:
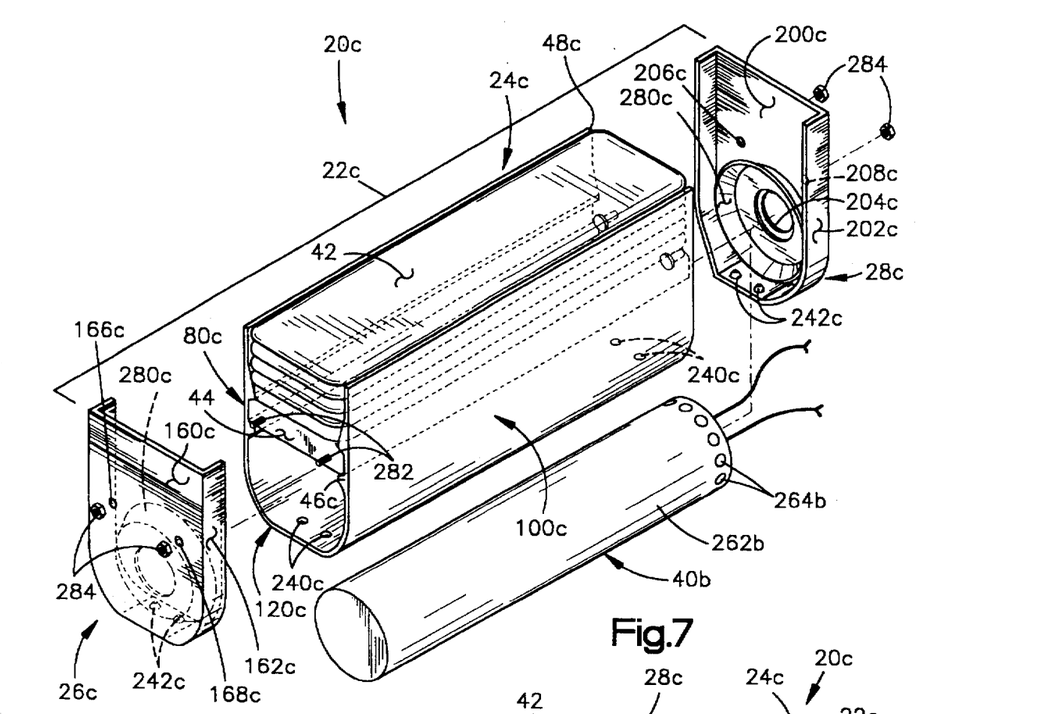
FIG. 7 is an exploded perspective view of an air bag module constructed according to a fourth embodiment of the present invention.

FIG. 7 illustrates an air bag module 20c which is constructed according to a fourth embodiment of the present invention. Parts of the air bag module 20c which are the same as parts of the air bag module 20 or 20b (FIGS. 1–2 and 5–6) are given the same reference numeral. Parts of the air bag module 20c which are different or modified versions of parts of the air bag module 20 are given the same reference numeral with a suffix "c".

The air bag module 20c, according to the fourth embodiment, includes a housing 22c having a main body 24c and two end plates 26c and 28c. The air bag module 20 includes the inflator 40b, the inflatable air bag 42, and the retainer 44.

The main body 24c of the housing 22c has opposite ends 46c, 48c. The end plate 26c engages the end 46c of the main body 24c. The end plate 28c engages the end 48c of the main body 24c. The main body 24c and the end plates 26c, 28c of the housing 22c cooperate to define a chamber 60 within the housing. A longitudinal axis A (FIG. 8) of the air bag module 20c extends between the end plates 26c and 28c of the housing 22c.

Figure 8:
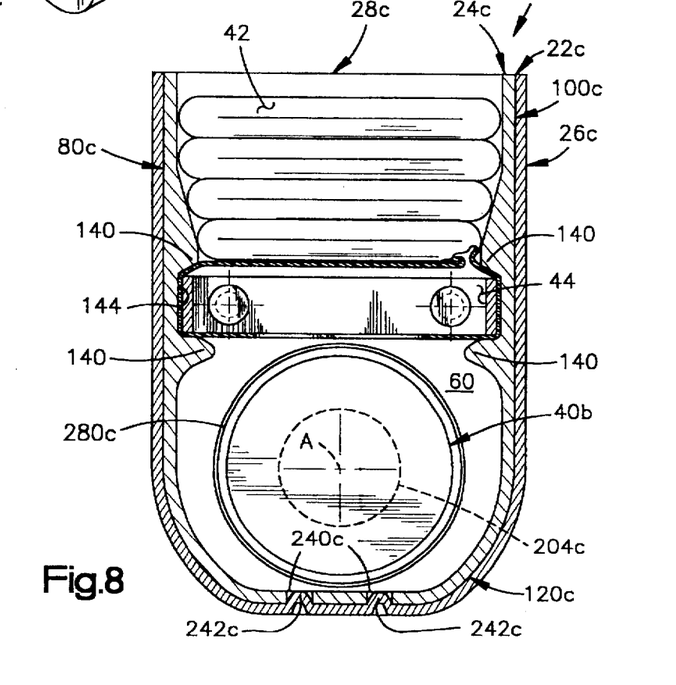
FIG. 8 is a sectional view of the assembled air bag module of FIG. 7.

The main body 24c includes a left side wall 80c and a right side wall 100c, as viewed in FIG. 8, which are spaced from and extend parallel to the axis A. A central wall 120c extends between and interconnects the left side wall 80c and the right side wall 100c. The central wall 120c is also spaced from and extends parallel to the axis A.

Parallel ribs 140 project inward from the side walls 80c and 100c and define a recess 144 in each side wall of the main body 24c. The recesses 144 receive the retaining ring 44 and a portion of the air bag 42.

The end plate 26c includes a plate portion 160c (FIG. 7) which extends perpendicular to the axis A when the end plate is attached to the main body. The plate portion 160c also extends perpendicular to the side walls 80c and 100c and the central wall 120c of the main body 24c. Two circular fastener openings 166c and 168c are also formed in the plate portion 160c of the end plate 26c. Each one of the fastener openings 166c and 168c is spaced from the axis A.

The end plate 26c also includes a flange portion 162c which extends from the plate portion 160c in a direction normal to the plate portion. The flange portion 162c of the end plate 26c extends in a direction toward the end plate 28 when the end plates are attached to the main body 24. The flange portion 162c extends from three sides of the plate portion 160c.

The end plate 28c of the housing 22c (FIG. 7) is similar to the end plate 26c. The end plate 28c includes a plate portion 200c which extends perpendicular to the axis A when the end plate is attached to the main body 24c. The plate portion 200c also extends perpendicular to the side walls 80c, 100c and the central wall 120c of the main body 24c. A circular wire opening 204c is formed in the plate portion 200c of the end plate 28c. The wire opening 204c has its center located on the axis A of the air bag module 20. A pair of fastener openings 206c and 208c are also formed in the plate portion 200c. The fastener openings 206c and 208c have the same diameter as the fastener openings 166c and 168c in the end plate 26c. Each one of the fastener openings 206c and 208c is spaced from the axis A and the wire opening 204c.

The end plate 28c also includes a flange portion 202c which extends from the plate portion 200c in a direction normal to the plate portion. The flange portion 202c of the end plate 28c extends in a direction toward the end plate 26c when the end plates are attached to the main body 24c. The flange portion 202c extends from three sides of the plate portion 200c.

Each end plate 26c, 28c includes a metal inflator mounting cup 280c attached by suitable means, such as by spot welding. Each mounting cup 280c is frustoconical in shape with its largest diameter end portion projecting into the chamber 60. The largest diameter end portion of each mounting cup 280c has a diameter which is greater than the outer diameter of the inflator 40b. The smallest diameter end portion of each mounting cup 280c has a diameter which is no greater than the outer diameter of the inflator 40b. The mounting cups 280c position and hold the inflator 40b in the chamber 60. It will be apparent that the mounting cups 280c could be formed with a different shape, such as cylindrical.

Two openings 240c are formed in the central wall 120c of the main body 24c adjacent each of the ends 46c, 48c. Two projections 242c are stamped on each flange portion 162c, 202c of the end plates 26c, 28c. The projections 242c extend into openings 240c in the central wall 120c of the main body 24c to hold the end plates 26c 28c on the main body 24c when the flange portions 162c, 202c of the end plates are fitted around a respective end portion of the main body.

Each of the projections 242c is generally cone shaped. The openings 240c and the projections 242c are sized so that each projection fits tightly within a respective opening. Preferably, a side surface of the projection 242c engages a circular surface defining the opening 240c. Engagement between the projections 242c and surfaces of the openings 240c acts in concert with friction of the flange portions 162c, 202c of the end plates 26c, 28c against the main body 24c to retain the end plates on the main body.

To assemble the air bag module 20c, the inflator 40b is placed into the main body 24c of the housing 22c of the air bag module 20. The inflator 40b is positioned in the chamber 60 and along the axis A by attaching the end plates 26c, 28c to the main body 24c. The mounting cups 280c on the end plates 26c, 28c encircle and retain opposite ends of the inflator 40b to position the inflator in the chamber 60 of the housing 22c when the end plates 26c, 28c are placed over the ends 46c, 48c of the main body 24c. The wires of the inflator 40b extend through the wire opening 204c in the end plate 28c.

The projections 242c on the end plates 26c, 28c extend into the openings 240c in the central wall 120c of the main body 24c to hold the end plates on the main body. Fasteners 282 on the retaining ring 44 extend through the fastener openings 166c, 168c, 206c, 208c in the end plates 26c, 28c. Nuts 284 are screwed onto the fasteners 282 extending from the end plates 26c, 28c. The end plates 26c and 28c are drawn up tight against the main body 24c of the housing 22c when the nuts 284 are tightened on the fasteners 282.

From the above description of the invention, those skilled in the art will perceive improvements, changes and modifications in the invention. For example, it will be apparent that any inflator mounting and positioning structure can be used with any arrangement of projections and openings to attach the end plates to the main body of the housing. Such improvements, changes and modifications within the skill of the art are intended to be covered by the appended claims.

Having described the invention, the following is claimed:

1. An apparatus comprising:

a housing including a main body and two end plates cooperating to define a chamber in said housing, said main body of said housing and said end plates defining a deployment opening in said housing;

attachment means on said end plates and said main body of said housing for attaching said end plates to said main body, said attachment means comprising a projection on one of said end plates and said main body which extends into an opening in the other of said end plates and said main body when said first and second end plates engage respective ends of said main body;

an inflatable vehicle occupant protection device located in the chamber to, upon inflation, extend through the deployment opening in said housing;

a retainer for mounting said inflatable vehicle occupant protection device to said housing;

an inflator in the chamber for, when actuated, inflating said inflatable vehicle occupant protection device; and said retainer including fastener means for holding said end plates to said main body.

2. The apparatus of claim 1 wherein each one of said end plates includes a plurality of fastener openings, said fastener means on said retainer comprising a plurality of fasteners projecting from said retainer through said fastener openings.

3. The apparatus of claim 1 further including means for mounting said inflator in the chamber of said housing and positioning said inflator relative to said main body.

4. The apparatus of claim 3 wherein said mounting means comprises a flange at one end of said inflator and a fastener at another end of said inflator, said flange engaging one end plate when the fastener extends through the other end plate.

5. The apparatus of claim 3 wherein said mounting means comprises a projection extending from one of said main body and said inflator to engage the other of said inflator and said main body to maintain said inflator in a position relative to said main body.

6. The apparatus of claim 3 wherein said mounting means comprises each of said end plates having a cup for receiving an end of said inflator to locate and hold said inflator in position relative to said main body.

7. An apparatus comprising:

a housing defining a chamber, said housing including a main body and two end plates, each end plate being located at a respective opposite end of said main body;

an inflatable vehicle occupant protection device located at least partially in the chamber in said housing;

a retainer securing said inflatable vehicle occupant protection device to said housing;

an actuatable inflator in the chamber for, when actuated, inflating said inflatable vehicle occupant protection device; and means on said end plates and said main body for attaching said end plates to said main body of said housing, said attaching means comprising an opening in one of said end plates and said main body and a projection on the other of said main body and said end plates, said projection receivable through the opening in a direction perpendicular to a longitudinal axis of said housing so as to inhibit movement of said end plates relative to said main body in a direction along said longitudinal axis of said housing.

8. The apparatus of claim 7 wherein each of said end plates includes a plate portion which extends perpendicular to said longitudinal axis of said housing and a flange portion which extends parallel to said longitudinal axis of said housing and which flange portion overlies an end of said main body of said housing, said projection being formed on said flange portion of said end plate.

9. The apparatus of claim 7 wherein said main body of said housing includes first and second side walls and a central wall which extends transverse to said first and second side walls and which interconnects said first and second side walls, each one of said first and second end plates of said housing having an outer peripheral shape substantially the same as said main body of said housing.

10. The apparatus of claim 9 wherein each of said first and second end plates includes a plate portion which extends perpendicular to a longitudinal axis of said housing and a flange portion which extends parallel to the axis of said housing and which flange portion overlies an end of said main body of said housing.

11. The apparatus of claim 10 further including a flange extending from a side wall of said main body and a tab end extending from a flange portion of one of said end plates, said projection being formed on said tab end and the opening being formed in said flange on said main body.

12. The apparatus of claim 10 wherein said projection is formed on said flange portion of said end plate.

13. The apparatus of claim 12 wherein the opening is formed in one of said side walls of said main body.

14. The apparatus of claim 12 wherein the opening is formed in said central wall of said main body.

15. The apparatus of claim 7 wherein each of said end plates includes a cup for receiving an end of said inflator to locate and hold said inflator in position relative to said main body.

16. The apparatus of claim 7 wherein said main body of said housing includes a portion projecting into the chamber to engage said inflator and space said inflator from walls of said main body and hold said inflator in position relative to said main body.

17. An apparatus comprising:
a housing defining a chamber, said housing including a main body and two end plates, each of said end plates located at a respective opposite end of said main body;
an inflatable vehicle occupant protection device located at least partially in the chamber in said housing;
a retainer mounting said inflatable vehicle occupant protection device to said housing;
an inflator in the chamber for, when actuated, inflating said inflatable vehicle occupant protection device;
means on said end plates and said main body for attaching said end plates to said main body of said housing, said attaching means comprising an opening in one of said main body and said end plates and a projection on the other of said main body and said end plates, said projection receivable in the opening to attach said end plates to said main body; and
fastener means extending through each of said end plates for further holding said end plates against said main body;
a portion of said fastener means being fixed to said retainer.

18. An apparatus comprising:
a housing defining a chamber, said housing including a main body and two end plates, each of said end plates located at a respective opposite end of said main body;
an inflatable vehicle occupant protection device located at least partially in the chamber in said housing;

a retainer mounting said inflatable vehicle occupant protection device to said housing;
an inflator in the chamber for, when actuated, inflating said inflatable vehicle occupant protection device;
means on said end plates and said main body for attaching said end plates to said main body of said housing, said attaching means comprising an opening in one of said main body and said end plates and a projection on the other of said main body and said end plates, said projection receivable in the opening to attach said end plates to said main body; and
first fastener means extending through each of said end plates for further holding said end plates against said main body;
said inflator being elongate and including first and second opposite end portions, second fastener means for mounting said inflator to one of said end plates being located on said inflator and comprising a threaded member fixed to said first end portion of said inflator and a flange attached to said second end portion of said inflator;
said inflator being located between said end plates and being cylindrical with a body portion having a first diameter, said flange of said inflator having a second diameter which is larger than said first diameter, said second end plate having an inflator opening with a third diameter which is at least as large as said first diameter and less than said second diameter, said flange of said inflator being engageable with said second end plate when said body portion of said inflator extends through said inflator opening, said threaded connector on said first end portion of said inflator extending through a first fastener opening in said first end plate;
each one of said first and second end plates including a plurality of second fastener openings, said first fastener means being located on said retainer and comprising a plurality of fasteners projecting from said retainer through said second fastener openings.

19. An apparatus comprising:
a housing defining a chamber, said housing including a main body and two end plates, each of said end plates located at a respective opposite end of said main body;
an inflatable vehicle occupant protection device located at least partially in the chamber in said housing;
a retainer mounting said inflatable vehicle occupant protection device to said housing;
an inflator in the chamber for, when actuated, inflating said inflatable vehicle occupant protection device;
means on said end plates and said main body for attaching said end plates to said main body of said housing, said attaching means comprising an opening in one of said main body and said end plates and a projection on the other of said main body and said end plates, said projection receivable in the opening to attach said end plates to said main body; and
fastener means extending through each of said end plates for further holding said end plates against said main body;
said main body of said housing including first and second side walls and a central wall which extends transverse to said first and second side walls and which interconnects said first and second side walls, each one of said first and second end plates of said housing having an outer peripheral shape substantially the same as said main body of said housing;

each one of said first and second end plates including a plate portion which extends perpendicular to a longitudinal axis of said housing and a flange portion which extends parallel to the axis of said housing and which flange portion overlies an end of said main body of said housing.

20. The apparatus of claim 17 wherein said projection is formed on said flange portion of said end plate.

21. The apparatus of claim 20 wherein the opening is formed in one of said side walls of said main body.

22. The apparatus of claim 20 wherein the opening is formed in said central wall of said main body.

23. The apparatus of claim 19 further including a flange extending from a side wall of said main body and a tab end extending from a flange portion of one of said end plates, said projection being formed on said tab end and the opening being formed in said flange on said main body.

24. An apparatus comprising:

a housing defining a chamber, said housing including a main body and two end plates, each end plate being located at a respective opposite end of said main body;

an inflatable vehicle occupant protection device located at least partially in the chamber in said housing;

a retainer securing said inflatable vehicle occupant protection device to said housing;

an actuatable inflator in the chamber for, when actuated, inflating said inflatable vehicle occupant protection device;

means on said end plates and said main body for attaching said end plates to said main body of said housing, said attaching means comprises an opening in one of said end plates and said main body and a projection on the other of said main body and said end plates, said projection receivable in the opening to inhibit movement of said end plates relative to said main body in a direction along a longitudinal axis of said housing; and fastener means on said retainer extending through each of said end plates to hold said end plates against said main body, said means on said end plates and said main body attaching said end plates to said main body of said housing prior to said end plates being held against said main body by said fastener means.

25. An apparatus comprising:

a housing defining a chamber, said housing including a main body and two end plates, each of said end plates being located at a respective opposite end of said main body;

an inflatable vehicle occupant protection device located at least partially in the chamber in said housing;

a retailer securing said inflatable vehicle occupant protection device to said housing;

an actuatable inflator in the chamber for, when actuated, inflating said inflatable vehicle occupant protection device; and fastener means on said retainer extending through each of said end plates to hold said end plates against said main body.

26. Apparatus as defined in claim 25 wherein said main body of said housing comprises resiliently deflectable means for snapping into interlocked engagement with said retainer.

* * * * *

UNITED STATES PATENT AND TRADEMARK OFFICE
CERTIFICATE OF CORRECTION

PATENT NO. : 5,676,390
DATED : October 14, 1997
INVENTOR(S) : Mark O. Olson

It is certified that error appears in the above-indentified patent and that said Letters Patent is hereby corrected as shown below:

Column 15, line 7, change "17" to --19--.

Signed and Sealed this

Twenty-ninth Day of September, 1998

Attest:

BRUCE LEHMAN

Attesting Officer                Commissioner of Patents and Trademarks